ERROR CORRECTING COMMUNICATION SYSTEM

Filed Aug. 25, 1966 Sheet 1 of 2

INVENTOR
J. W. LECHLEIDER
BY Daniel D. Dubosky
ATTORNEY

United States Patent Office 3,444,516
Patented May 13, 1969

3,444,516
ERROR CORRECTING COMMUNICATION SYSTEM

Joseph W. Lechleider, Murray Hill, N.J., assignor to Bell Telephone Laboratories, Incorporated, Murray Hill and Berkeley Heights, N.J., a corporation of New York Filed Aug. 25, 1966, Ser. No. 575,153
Int. Cl. G08b *29/00;* H04b *7/02*
U.S. Cl. 340—146.1 10 Claims This invention relates to transmission systems which utilize redundancy in the system for the purpose of error correction, and more particularly, to systems which utilize transmission over multiple channels to achieve the redundancy.

Figure 1:
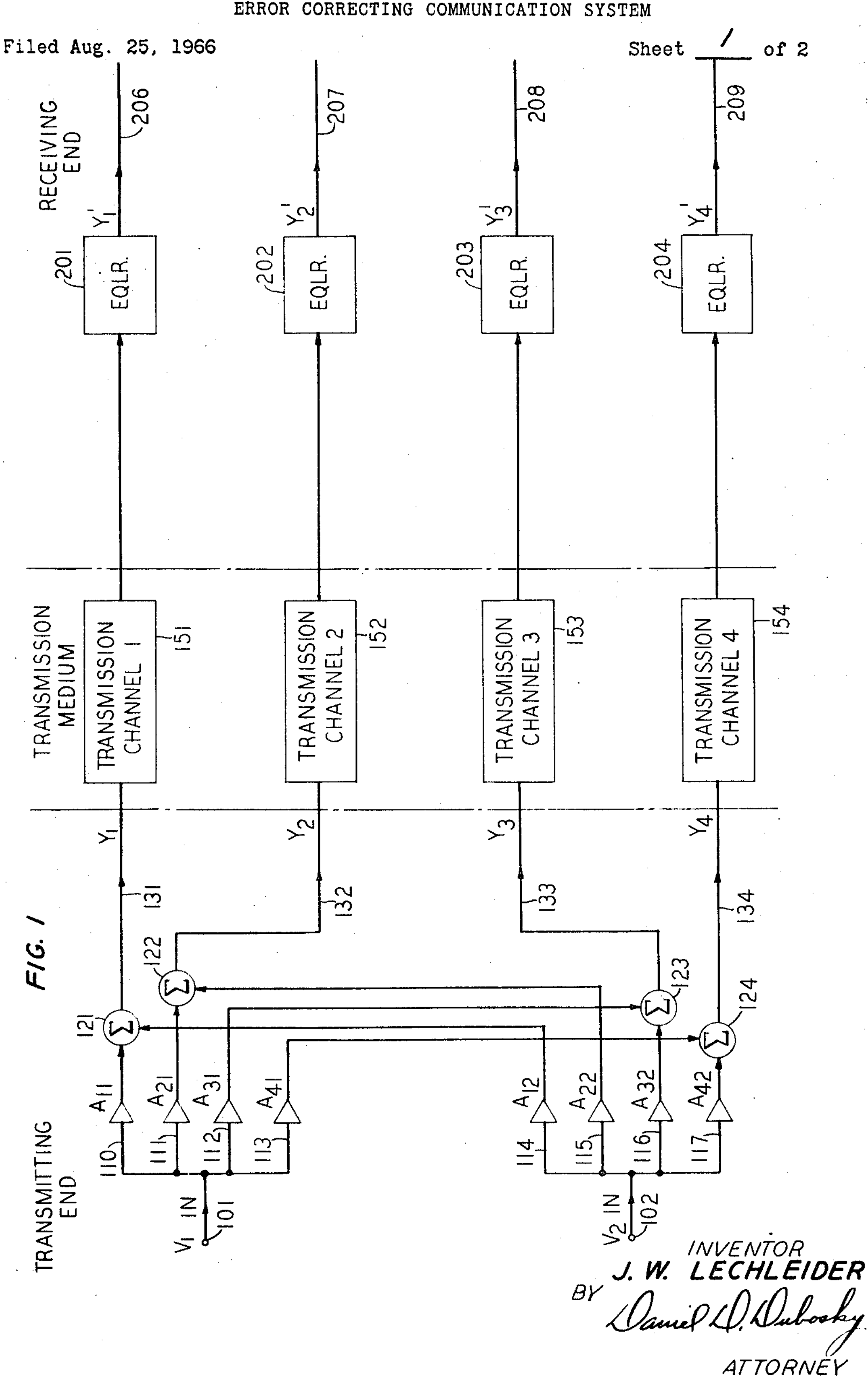

An error can be said to occur in a transmission channel at any time when the signal at the output of the channel differs significantly from the signal which was applied to the input. Errors can occur in all types of modulated and unmodulated systems. They can be introduced by noise within the system such as amplifier noise, by externally generated noise such as lightning, by fading or a change in the transmission medium as in radar systems, and even by a complete breakdown of the transmission channel. In prior art PCM (pulse code modulated) systems, many schemes of encoding have been devised which enable the receiver to detect and correct rarely occurring errors which affect only a small number of pulses during each occurrence. In even the simplest of these systems, however, the equipment for encoding, decoding and correcting is complex and expensive. In addition, unless the coding occurs over a large number of pulses (in which case the system is even more complex, expensive and inefficient), this type of error correction is totally ineffective against errors which occur over a large number of pulses, such as those which may be introduced by lightning, fading, or the complete breakdown of a channel. For these long-term errors, commonly called burst errors, coding is quite impractical as a means of error correction.

All of the above-mentioned errors can be corrected if redundancy is provided in the system rather than in the signal. For example, in some microwave radio relay systems, a signal can be switched from one channel to another in the event that the first channel becomes noisy or inoperative. If, however, the signal is in the form of a high speed stream of PCM bits, and error may still be introduced since it takes time to sense the malfunction and switch to an idle channel. As an alternative to switching, one could transmit each signal over at least three channels and use a vote-taking scheme at the receiver to determine which one of the channels is in error. Assuming that only one channel is in error, the signals coming from the other two channels will be equal and detection of that equality can be utilized to isolate the erroneous channel. Since two-thirds of the channels in this triplication scheme are redundant, the scheme is very expensive.

Accordingly, one object of the present invention is the correction of errors which occur over a long time interval in a pulse transmission system.

Another object of the present invention is to correct short-term errors even those which occur at a high speed stream of PCM bits.

Still another object of the present invention is to reduce the percentage of channels utilized for redundancy in an error-correcting channel-redundant system.

These and other objects are achieved in accordance with the present invention wherein M different functional combinations of N message signals are developed and transmitted over M path diversity channels where M and N are integers and M is greater than N. Since the functional relationships are predetermined, the original message signals may be recovered from the combination signals to permit error-free recovery of all N original message signals even though $(M-N-1)$ of the M channels have introduced an error.

Although the number of channels (M) which is necessary in order to correct a single erroneous channel when only one message signal is sent $(N=1)$ is still equal to three as in the triplication scheme, the percentage of redundancy goes down markedly as the number of message signals is increased. For example, two message signals $(N=2)$ sent over only four channels $(M-4)$ can be recovered error-free even though one of the channels has introduced an error. If the two message signals are sent over five channels, they can be recovered error-free even though two of the channels have introduced an error. As the number of message signals combined in accordance with the instant invention is increased, the benefits and advantages of the instant invention become even more outstanding.

The theoretical basis for the present invention can be quite easily related to the solution of linear algebraic equations. To solve an equation with N unknowns, at least N independent equations are needed. In order to determine that one or more of these equations are in error, at least $N+1$ equations are needed. The solutions derived from Equations 1 through N can be compared with the solutions derived from Equations 2 through $N+1$; if a difference exists, it can be concluded that one or more of the equations are in error. If, however, no difference exists between the two sets of solutions obtained from the two sets of N equations, it can be concluded that the $N+1$ equations are free of error.

It should be noted that an equation with an error cannot be included in the $N+1$ equations which are necessary to establish two identical sets of solutions either one of which in turn can be concluded to represent the true values of the unknowns. Hence, if one equation is expected to be in error, at least $N+2$ independent equations are needed; if two equations are expected to be in error, at least $N+3$ independent equations are needed; and so on by extrapolation to the equation, $M=N+1+E$, where M is the number of equations needed, N is the number of unknowns, and E is the number of equations in error. Accordingly, if M independent equations are available, N unknowns can be determined even though $(M-N-1)$ equations are in error.

Figure 2:
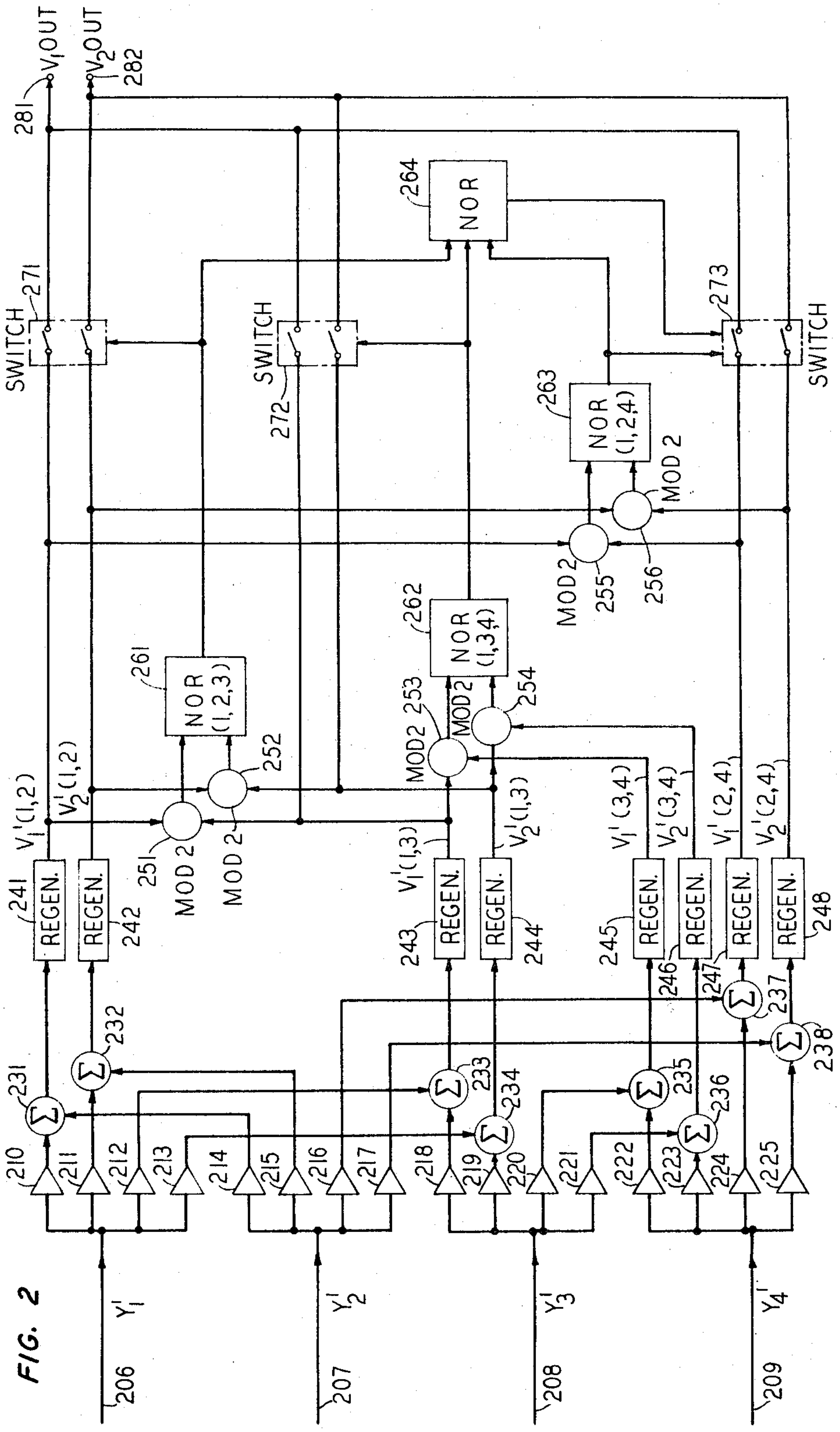

Applicability of the above mathematical concepts to the present invention and the many objects and advantages of the present invention will become better understood by reference to the following detailed description when considered in connection with the accompanying drawing in which FIGS. 1 and 2 placed end-to-end by interconnecting lines 206–209 are a schematic block diagram of an embodiment of the present invention.

In the embodiment shown in the drawing, a first message signal to be transmitted, $V_1$, is applied to input terminal 101, and a second message signal to be transmitted, $V_2$, is applied to input terminal 102. For purposes of the embodiment shown, these signals will be assumed to be monopolar PCM (pulse code modulated) signals having a value of either 0 or +1 at any given instant. As will be pointed out hereinafter, the invention is in no way limited, however, to the transmission of this particular type of signal.

The signal $V_1$ is applied to the inputs of amplifiers 110, 111, 112, and 113 which have constant gains of $A_{11}$, $A_{21}$, $A_{31}$, and $A_{41}$, respectively. The signal $V_2$ is connected to the inputs of amplifiers 114, 115, 116, and 117, which have constant gains of $A_{12}$, $A_{22}$, $A_{32}$, and $A_{42}$, respectively. Summing amplifier 121 has two inputs, one of which is connected to receive the output of amplifier 110 and the other of which is connected to receive the output of amplifier 114. The output of summing amplifier 121 provides a signal, $Y_1$, on line 131 having an amplitude value in terms of the original signals as indicated by the following equation: $Y_1=A_{11}V_1+A_{12}V_2$. Similarly, summing amplifiers 122, 123 and 124 combine the outputs from the remaining amplifiers, 111, 112, 113, 115, 116, and 117, to provide signals $Y_2$, $Y_3$, and $Y_4$ on lines 132, 133, and 134 respectively which signals have amplitude values at any given instant determined by the following equations:

$$Y_2=A_{21}V_1+A_{22}V_2$$
$$Y_3=A_{31}V_1+A_{32}V_2$$

and $$Y_4=A_{41}V_1+A_{42}V_2$$

Although the gain of each of the amplifiers 110–117 has been written in generalized form each bearing a different subscript, this is not to be interpreted to mean that each gain must necessarily differ from all others. Each gain must be constant, non zero, and must be related to the other gains in a way so as to produce a distinctive combination of the input signals $V_1$ and $V_2$ on each of the leads 131, 132, 133, and 134, that is to say, the equations for $Y_1$ through $Y_4$ must be independent.

The combination signals, $Y_1$, $Y_2$, $Y_3$, and $Y_4$, are transmitted over individual transmission channels shown in the drawing as boxes 151–154, respectively, to the receiving end of the system. The transmission channels should be sufficiently separate and distinct from each other so that not more than one channel is likely to suffer from an error-producing cause at any given instant. Although placing the channels on physically separate facilities will do, this is by no means always necessary. For example, if the error-producing cause is related to frequency, as is fading, the transmission channels can be separated by placing each one in a different portion of the frequency band of a radio transmission system.

The outputs of transmisison channels 151–154 are respectively connected to the inputs of equalizers 201–204 at the receiving end. Each of the equalizers 201–204 is adjusted to provide the proper amount of additional loss and delay to its respective channel such that each of the signals on lines 131–134 will encounter the same amount of loss and delay in passing through the associated transmission channel and equalizer. At the outputs of equalizers 201–204, the signals, designated in the drawing as $Y_1'$, $Y_2'$, $Y_3'$, and $Y_4'$, appear on leads 206–209, respectively. Each signal represented by a primed letter will be equal to the signal represented by the unprimed letter; provided that no error has occurred in the transmission channel.

The Y signals are analogous to the constant members of a set of simultaneous equations representing the operations performed on the original signals, $V_1$ and $V_2$, at the transmitting end. Since these operations are known and constant, inverse operations can now be performed to recover the unknown original signals, $V_1$ and $V_2$. As pointed out hereinabove, the $Y_1$ and $Y_2$ signals were formed by operations indicated by the following equations:

$$Y_1=A_{11}V_1+A_{12}V_2$$
$$Y_2=A_{21}V_1+A_{22}V_2$$

Solving the equations by well-known mathematical techniques, we obtain:

$$V_1=\frac{A_{22}}{A_{11}A_{22}-A_{12}A_{21}}Y_1+\frac{-A_{12}}{A_{11}A_{22}-A_{12}A_{21}}Y_2$$

and $$V_2=\frac{-A_{21}}{A_{11}A_{22}-A_{12}A_{21}}Y_1+\frac{A_{11}}{A_{11}A_{22}-A_{12}A_{21}}Y_2$$

The gain of amplifier 210 is made equal to $$\frac{A_{22}}{A_{11}A_{22}-A_{12}A_{21}}$$

and the gain of amplifier 214 is made equal to $$\frac{-A_{12}}{A_{11}A_{22}-A_{12}A_{21}}$$

The input of amplifier 210 is connected to receive the $Y_1'$ signal and the input of amplifier 214 is connected to receive the $Y_2'$ signal. Summing amplifier 231 is connected so as to add the outputs of both amplifiers thereby presenting at its output a recovered message signal, $V_1'$ (1, 2), which represents $V_1$, provided that $Y_1'$ and $Y_2'$ are error-free and therefore equal to $Y_1$ and $Y_2$. Similarly, the gain of amplifiers 211 and 215 are made equal to $$\frac{-A_{21}}{A_{11}A_{22}-A_{21}A_{12}} \text{ and } \frac{A_{11}}{A_{11}A_{22}-A_{12}A_{21}}$$

respectively, and their outputs are combined in summing amplifier 232 to form at its output a recovered message signal, $V_2$ (1, 2), which represents $V_2$ provided that $Y_1=Y_1'$ and $Y_2=Y_2'$. Regenerators 241 and 242 operate on the signals at the outputs of amplifiers 231 and 232 in order to reshape the signals to a clearly monopolar PCM form.

Amplifiers 212, 218 and 233 operate on and combine the $Y_1'$ and $Y_3'$ signals to provide at the output of regenerator 243 a recovered message signal $V_1'$ (1, 3), representing $V_1$, based on the information received from channels 1 and 3. Amplifiers 213, 219, and 234 combine the $Y_1'$ and $Y_3'$ signals to provide at the otuput of regenerator 244 a recovered message signal, $V_2'$ (1, 3), representing $V_2$ based on the information received over channels 1 and 3. Similarly, amplifiers 216, 217, 220–225, 235–238 and regenerators 245–248 provide other recovered message signals representing the $V_1$ and $V_2$ signals but based on information received over other sets of transmission channels. In each case the recovered message signal is designated in the drawing at the output of the regenerator by a subscript representing the number of the original signal and two numbers in parentheses representing the two channels which were used in deriving the representative signal.

The signal representing $V_1$ based on information from the first and second channels, $V_1'$ (1, 2), is compared in modulo 2 adder 251 at each instant with the signal $V_1'$ (1, 3), a signal representing $V_1$ based on the information from the first and third channels. A modulo 2 adder is a logical circuit, well known in the art, for providing no output, i.e., a "0," when the two signals presented to its two inputs are the same, i.e., both "0" 's or both "1" 's, and for providing an output, i.e. a "1," when the two signals presented to its two inputs differ, i.e., one input is a "0" and the other is an "1." Accordingly, modulo 2 adder 251 will provide an output only when $V_1'$ (1, 2) differs from $V_1'$ (1, 3). Modulo 2 adder 252 compares $V_2'$ (1, 2) and $V_2'$ (1, 3) and produces an output only when these two signals representing the $V_2$ signal differ. The outputs of modulo 2 adder 251 and modulo 2 adder 252 are respectively connected to the inputs of NOR circuit 261. A NOR circuit is a logical circuit, well known in the art, for providing an output if neither its first input nor its second input is energized, i.e., an output "1" is provided if and only if both inputs are "0." Accordingly, NOR circuit 261 has an output "1" if and only if $V_1'(1,2)=V_1'(1,3)$ and $V_2'(1,2)=V_2'(1,3)$. Since these latter two equalities can occur in a system wherein only one channel may be in error only if the erroneous channel has not been utilized in deriving the $V_1'$ and $V_2'$ voltages, an output from NOR circuit 261 is an indication that channels 1, 2 and 3 are free of errors. The output from NOR circuit 261 is connected to control switch 271 which in turn connects the $V_1'$ and $V_2'$ voltages from regenerators 241 and 242 through to output terminls 281, and 282, respectively, when NOR circuit 261 has an output, thereby indicating that channels 1, 2, and 3 are free of error. If any one of the channels 1, 2, or 3 is in error, $V_1'(1,2)\neq V_1'(1,3)$ or $V_2'(1,2)\neq V_2'(1,3)$, and therefore the modulo 2 adders 251 and 252 will produce outputs which in turn cause the "1" output to be removed from NOR circuit 261 output, thereby deactivating switch 271 and disconnecting the $V_1'$ (1, 2) and $V_2'$ (1, 2) signals from output terminals 281 and 282, respectively.

In a similar fashion, NOR circuit 262 operates switch 272 thereby connecting $V_1'$ (1, 3) and $V_2'$ (1, 3) through to output terminals 281 and 282, respectively, provided that neither one of the inputs to NOR circuit 262 has received a signal from modulo 2 adder 253 or 254. The latter modulo 2 adders will not produce ouputs providing $V_1'(1,3)=V_1'(3,4)$ and $V_2'(1,3)=V_2'(3,4)$, which conditions of equality are an indication that channels 1, 3, and 4 are free of error and therefore the signals derived from channels 1 and 3 i.e., $V_1'$(1, 3) and $V_2'$(1, 3) are a true representation of the original signals $V_1$ and $V_2$.

Consequently, if the signal from channel 2 is in error and channels 1, 3 and 4 are error-free, switch 271 will be opened and switch 272 will remain operated so as to provide the output terminals with the $V_1'$ (1, 3) and $V_2'$(1, 3) signals, whereas if channel 4 is in error and channels 1, 2, and 3 are error-free, switch 272 will be opened and switch 271 will remain operated so as to provide the output terminals with the $V_1'$ (1, 2) and $V_2'$ (1, 2) signals.

If channel 3 is in error and channels 1, 2, and 4 are error-free, neither switch 271 nor switch 272 will be operated, but $V_1'(1,2)=V_1'(2,4)$ and $V_2'(1,2)=V_2'(2,4)$. Hence, neither modulo 2 adder 255 nor modulo 2 adder 256 will produce an output, and therefore NOR circuit 263 will continue to produce a "1" output which activates switch 273, thereby connecting $V_1'$ (2, 4) and $V_2'$ (2, 4) through to output terminals 281 and 282, respectively.

If channel 1 is in error and channels 2, 3 and 4 are error-free, none of the NOR circuits 261, 262, or 263 produces a "1" output. This latter condition is recognized by NOR circuit 264 as an indication that channel 1 is in error and that signals derived from channels 2 and 4 would be a true representation of the original signals. Accordingly when all three inputs to NOR circuit 264 are supplied with a "0," NOR circuit 264 supplies a "1" to switch 273, thereby activating the latter and connecting $V_1'$ (2, 4) and $V_2'$ (2, 4) through to output terminals 281 and 282, respectively.

That the operation of the instant invention at the receiving end is analogous to solving simultaneous algebraic equations should now be apparent. The signals to be transmitted, e.g., $V_1$ and $V_2$, are equivalent to the unknowns which have been combined at the transmitting end of the system in accordance with predetermined relationships into $M(=N+1+E)$ signals each of which is analogous to the constant members of a set of simultaneous equations representing the predetermined relationships, where N is the number of signals to be transmitted and E is the number of channels which are permitted to be in error without causing an error in transmission. For the circuit described hereinabove, $M=4$, $N=2$, and $E=1$. At the receiving end of the system, electronic circuitry solves the simultaneous equations representing the combination process at the transmitting end in several different sets so as to provide several sets of solutions to the equations; that is to say, to provide several sets of signals representing the original signals. Additional circuitry compares the sets of signals and when two sets are found to match, it is concluded that the channels which transmitted the information on which these solutions are based are error-free. At least one set of matching signals is coupled to output terminals as a set representative of the original signals to be transmitted.

In the circuit shown in the drawing, the operation of the logical circuitry and switches was essentially instantaneous as compared with the duration of a single pulse. If, however, the duration of a single pulse is comparable to the time required for the operation of the logical circuitry and switches, delay lines can be inserted at the inputs to each of the switches in order to delay the $V_1'$ and $V_2'$ signals for an interval equal to the time required for the modulo 2 adders and NOR circuits to operate.

What has been described hereinbefore is a specific illustrative embodiment of the principles of the present invention. It is to be understood that numerous other arrangements of physical parts and different component parts may be utilized with equal advantage. For example, it will be readily appreciated that although the invention has been described in terms of a system which is processing PCM signals, the invention is equally applicable to other types of signals. If the input signals, $V_1$ and $V_2$, are simple analogue signals, regenerators 241–248 are no longer necessary and modulo 2 adders 251–256 are replaced by difference amplifiers coupled to threshold amplifiers which will trigger the NOR circuits when the differences between the sets of derived signals become significant.

Accordingly, it is to be understood that the above-described arrangement is illustrative of the application of the principles of the present invention and numerous modifications may be devised by those skilled in the art without departing from the spirit and scope of the invention.

What is claimed is:

1. In combination, a source of at least a first and a second message signal, means for combining said first and second message signals in at least four different ways to form at least four combination signals, at least four diverse transmission channels each for communicating one of said combination signals to a receiving terminal, means at said receiving terminal responsive to said combination signals for forming a plurality of recovered first and second message signals, each of said recovered first and second message signals being derived from a different set of combination signals, means for comparing like recovered message signals to detect an erroneous combination signal, and means for eliminating any recovered message signal which is derived in part from said erroneous combination signal.

2. The combination as defined in claim 1 wherein said means for combining said first and second message signals includes at least four summing amplifier means each of which has at least two inputs and an output, first amplitude control means for connecting said first message signal to one of said two inputs of each summing amplifier means, second amplitude control means for connecting said second message signal to the other of said two inputs of each summing amplifier means, and means for connecting the combination signal at the output of each summing amplifier means to one of said four diverse transmission channels.

3. The combination as defined in claim 2 wherein said means for forming a plurality of recovered first and second message signals includes at least eight summing amplifier means each having at least two inputs and an output, means connecting the two inputs of four of said eight summing amplifiers to four different predetermined pairs of combination signals from said four diverse transmission channels for providing four recovered first message signals at the outputs of said last-mentioned summing amplifiers, and means connecting the two inputs of the other four of said eight summing amplifiers to the same four different predetermined pairs of combination signals for providing four recovered second message signals at the output of said other four summing amplifiers.

4. The combination as defined in claim 3 wherein said first and second message signals are pulse code modulated signals and said means for comparing like recovered message signals includes modulo 2 adders having two inputs and an output, one of said two inputs being connected to a recovered message signal derived from two of said four combination signals, and the other of said two inputs being connected to a like recovered message signal derived from a different two of said four combination signals, whereby an output from a modulo 2 adder indicates a difference in the recovered message signals at said modulo 2 adder inputs and therefore an error in the combination signals from which said recovered message signals have been derived.

5. In a system for the transmission of message signals wherein there are at least two more transmission channels than message signals, means for ensuring the error-free transmission of the message signals comprising separate means equal in number to the transmission channels and responsive to the message signals for providing the input of a respective transmission channel with a respectively unique combination of the message signals, means for providing a plurality of sets of recovered message signals in response to the combination signals at the outputs of said transmission channels, each set of recovered message signals being derived from a different group of transmission channels, means for comparing the recovered message signals in one set with like message signals in other sets of message signals in order to detect a transmission channel wherein an error has been introduced, and means for excluding those sets of recovered message signals which have been derived from an erroneous transmission channel.

6. The system as defined in claim 5 wherein said separate means for providing the input of each transmission channel with a unique combination of message signals each includes a summing amplifier means having an output and a plurality of inputs equal to the number of message signals, means connecting the output of said summing amplifier means to its respective transmission channel, and separate means equal to the number of amplifier inputs for establishing and connecting a predetermined amplitude of each of said message signals to a different one of the inputs of said summing amplifier means.

7. The system as defined in claim 6 wherein said means for providing a plurality of sets of recovered message signals includes means for adding predetermined amounts of a group of combination signals in order to provide the recovered message signals in each set, the particular recovered message signal being determined by the relative amounts added of each combination signal in the group.

8. The system as defined in claim 7 wherein said message signals are in pulse code modulated form having a condition representing either "0" or "1" at any given instant and said means for comparing recovered message signals in one set with like message signals in other sets includes a plurality of logical circuit means each having two inputs and an output, means connecting a recovered message signal in said one set to one of the two inputs of said logical circuit means, and means connecting an equivalent recovered message signal in one of said other sets to the other of the two inputs of said logical circuit means, an energizing signal being provided at the output of said logical circuit means only when the signals at its two inputs differ in condition.

9. The system as defined in claim 8 wherein said means for excluding those sets of recovered message signals which have been derived from an erroneous transmission channel includes a plurality of normally closed switching means connected to said means for providing a plurality of sets of recovered message signals for coupling the same through to output terminals, and means for activating said switching means to its open position in response to an energizing signal at the output of a logical circuit means having one of its inputs connected to receive a recovered message signal from the set associated with said switching means.

10. In a system of M channels for the transmission of N message signals wherein N is an integer greater than one and M is an integer at least equal to $(N+2)$, means for combining the N message signals into M different combination signals, means connecting each combination signal to a different one of the M channels, means for combining the output signals from N of said M channels to provide a first set of recovered message signals, means for combining the output signals from a different N of said M channels to provide a second set of recovered message signals, means for comparing the recovered message signals in said first set with like recovered message signals in said second set, and switching means for connecting said first set of recovered message signals to output terminals except when said comparing means indicates that a difference exists between a recovered message signal in said first set and a like recovered message signal in said second set.

References Cited

UNITED STATES PATENTS

| | | | |
|---|---|---|---|
| 3,072,748 | 1/1963 | Abraham | 325—56 X |
| 3,214,691 | 10/1965 | Sproul et al. | 325—56 X |
| 3,390,335 | 6/1968 | Miyagi | 325—56 |

MALCOLM A. MORRISON, *Primary Examiner.*

CHARLES E. ATKINSON, *Assistant Examiner.*

U.S. Cl. X.R.

325—56